Dec. 14, 1971  L. E. BERNIER ET AL  3,626,611

CLEAT PLATE FOR GOLF SHOES

Filed Aug. 24, 1970

INVENTORS
LOUIS E. BERNIER
JAMES P. GIBLIN
BY Roberts Cushman + Grover
ATT'YS

United States Patent Office 3,626,611
Patented Dec. 14, 1971

3,626,611
CLEAT PLATE FOR GOLF SHOES
Louis E. Bernier, Rockland, and James P. Giblin, Milton, Mass., assignors to E. T. Wright & Co., Inc., Rockland, Mass.
Filed Aug. 24, 1970, Ser. No. 66,503
Int. Cl. A43c *15/00*
U.S Cl. 36—67 R                     13 Claims

ABSTRACT OF THE DISCLOSURE

Cleat plates adapted to be incorporated in the bottom of a shoe by molding of an elastomer about the cleat plates to attach them to the shoe, the cleat plates corresponding in configuration to the portions of the shoe bottom in which they are to be incorporated and having extending from one broad side a plurality of cleats, said cleats being arranged symmetrically with respect to the longitudinal center line of the plate; characterized in that the cleat plates have at the broad side from which the cleats extend, in the area intermediate the cleats and extending along the longitudinal center line, shallow recesses which reduce the thickness of the plates, said recesses commencing at one end and extending toward the other end beyond the midlength of the plates. Additional recesses may extend from the opposite end of the cleat plates toward the one end.

BACKGROUND OF THE INVENTION

Cleat plates comprised of an elastomer to which a plurality of cleats are fixed so as to end from one broad side thereof for incorporation in a shoe bottom by molding of an elastomer to the bottom of a shoe about the cleats are shown in our Pat. Nos. 3,486,249, dated Dec. 30, 1969 and 3,492,744, dated Feb. 3, 1970 and our pending applications Ser. Nos. 774,286, filed Nov. 8, 1968 and 774,382, filed Nov. 8, 1968.

The elastomer employed for forming the bottom is generally a thermoplastic elastomer which is relatively viscous when injected into the mold and the slow flowing characteristic of this material impedes spreading of the elastomer throughout the mold cavity around the cleat plate especially at the lower side where the protrusion of the cleats act as barriers to flow of the elastomer. It is accordingly a purpose of this invention to provide cleat plates so designed as to improve the flow of the elastomer within the mold cavity especially about the lower sides of the cleat plates.

SUMMARY

As herein illustrated, the cleat plate according to this invention corresponds in configuration to the part of the bottom into which it is to be incorporated but is thinner than said bottom and has projecting from one broad side a plurality of cleats which are arranged symmetrically with respect to the longitudinal center line of the plate. Bosses of circular cross-section surround the cleats and the surfaces of these bosses are roughened and coated with an adhesive. Adhesive may also be applied to the surfaces of the cleats extending from the bosses. In accordance with this invention the cleat plate is characterized in that it has at the broad side from which the bosses and cleats extend a shallow recess located in the area between the bosses along the longitudinal center line and extending from one end of the plate more than half the distance between the ends so as to reduce the thickness of the plate in this area and to constitute a channel along which the elastomer introduced into the mold is free to flow with less restriction. There may also be one or more recesses entering from the opposite end and extending toward the recess at the one end to further facilitate the flow of elastomer. Preferably but not necessarily the surfaces of the recesses are roughened and coated with an adhesive.

The invention will now be described in greater detail with reference to the accompanying drawings wherein.

Figure 1:
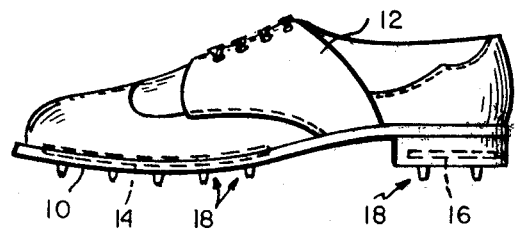
FIG. 1 is an elevation of the shoe with a molded bottom containing cleat plates of the present invention.
Figure 2:
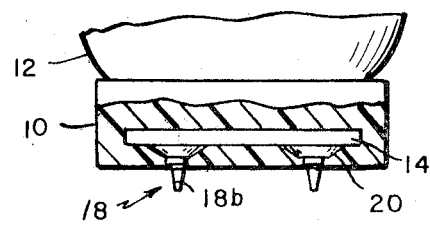
FIG. 2 is a transverse section of the shoe shown in FIG. 1 showing the cleat plate embedded in the bottom.

The cleat plates of this invention are especially designed for the purpose of making shoes with cleated bottoms by molding a sole 10 comprised of an elastomer, for example polyvinyl chloride, to the bottom of a lasted upper 12 by supporting the lasted upper against the open top of a mold having a side ring and a sole plate, supporting cleat plates 14 and 16 in the mold between the sole plate and the bottom of the lasted upper and then injecting the elastomer into the mold cavity about the cleat plates, there being one supported at the forepart and one supported at the heel part.

The cleat plates 14 and 16 correspond in configuration to the portion of the bottom into which they are to be incorporated but are smaller in area and thinner than the bottom so as to become completely embedded in the bottom. Each cleat plate has a plurality of conical bosses integral with one broad surface from which project cleats, the latter having heads at the ends buried within the bosses which anchor them to the plates. The surfaces of the bosses are roughened and adhesive is applied thereto and also to the surface portions of the cleats which extend from the bosses and will be contained within the bottom.

More specifically (FIGS. 3 and 4), the cleat plate 14 at the forepart has at one broad side, to wit, the lower side as disposed in the bottom of the shoe, a plurality of cleats 18, each of which is centered within a conical boss 20 integral with the broad side of the plate, each cleat having a head 18*a* buried in the plate and a tapering metal shank 18*b* of circular cross-section extending from the conical boss, the lower end of which is adapted to receive a hardened tip. There are seven (7) cleats projecting from the plate 14, one located at the tip substantially on the longitudinal center line of the plate and the others located substantially symmetrically at opposite sides of the longitudinal center line near the opposite edges of the plate. As shown, the cleat plate 14 corresponds in configuration to the forepart of the shoe but is smaller in area and is thinner than the bottom.

Figure 7:
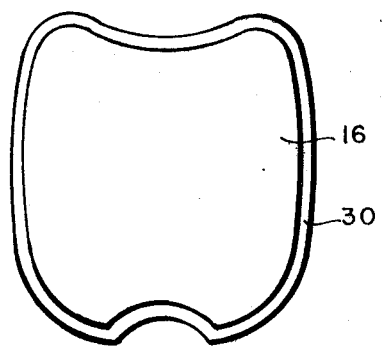
FIG. 7 is a plan view of the opposite side of the heel cleat plate shown in FIG. 5.
Figure 5:
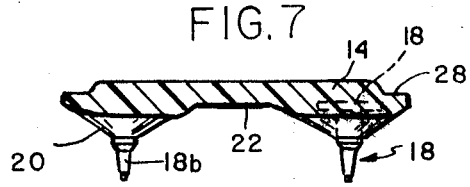
FIG. 5 is a section taken transversely of the cleat plate shown in FIG. 4.
Figure 6:
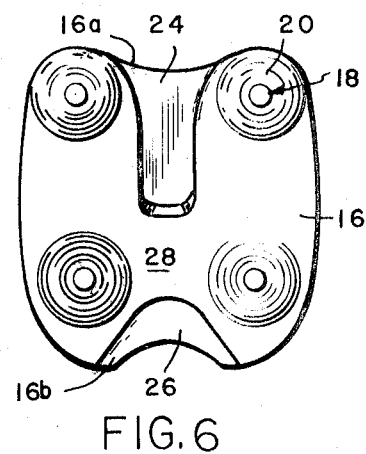
FIG. 6 is a plan view of the broad side of the heel cleat plate.

The cleat plate 16 at the heel end corresponds in configuration to the heel end of the shoe, as shown in FIGS. 6 and 7, and has at one broad side cleats 18 extending from bosses 20, the latter being integral with the broad side of the plate. These cleats are arranged two at one end and two at the other end substantially symmetrically with respect to the longitudinal center line. The surfaces of the bosses are roughened and these roughened surfaces and the surfaces of the cleats, which will be contained within the bottom, are coated with adhesive.

As related above, the elastomer is quite viscous and when injected into the mold free flow is impeded to considerable extent at the underside of the plate, that is, between the lower side of the plate and the upper side of the sole plate by the downwardly protruding bosses and cleats so much so that the elastomer may begin to set up before it completely fills the mold thus leaving voids and/or an incompletely formed bottom. It is the purpose of this invention to so construct the cleat plates as to enhance the flow of the elastomer into the mold between the underside of the cleat plates and the upper side of the sole plate. To this end the forepart cleat plate 14 is provided with a shallow recess 22 in the broad side from which the cleats project in the area between the bosses at the opposite sides of the longitudinal center line, said recess extending from the butt end 14a of the plate forwardly toward the toe end 14b beyond the midlength of the cleat plate. The recess 22 reduces the thickness of the plate in this area to approximately half the thickness of the cleat plate at either side thereof and where it enters the butt end of the plate is flared laterally toward the bosses at either side so as to enhance the flow of the elastomer into and along it toward the opposite end. Because the forepart plate is relatively long a second recess 22a may be provided which extends from the inner end of the recess 22 laterally between the boss at the tip and the boss next thereto at one side. Optionally, a third recess 22b may be provided which extends from the end of the recess 22 laterally between the boss at the tip and the boss next thereto at the other side.

In like manner, the cleat plate 16 is provided with a shallow recess 24 in the area between the bosses along the longitudinal center line which extends from the breast line 16a of the cleat plate toward the rear end 16b and optionally a second recess 26 which extends from the rear end 16b forwardly toward the breast line. The recess 24 extends more than half the distance between the ends of the plate and the recess 26 extends from the rear end toward the recess 24, terminating short of a line drawn through the centers of the two cleats at the rear end, leaving an island 28 of undiminished thickness therebetween.

The depths of the recesses in both plates is approximately half the thickness of the plate and provide channels through which the viscous elastomer can flow lengthwise of the plates. The surfaces of the recesses are roughened and preferably but not necessarily coated with an adhesive.

Figure 3:
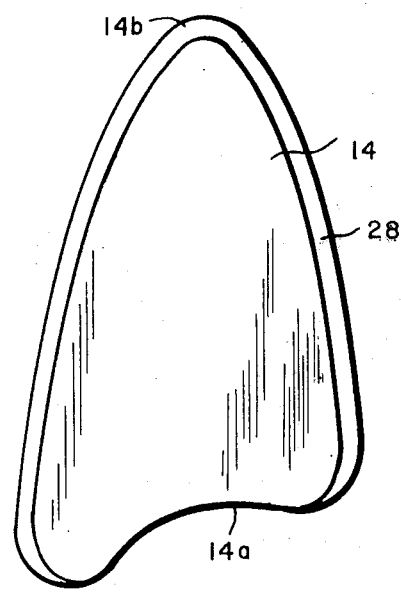
FIG. 3 is a plan view of the broad side of a forepart cleat plate from which the cleats extend.
Figure 4:
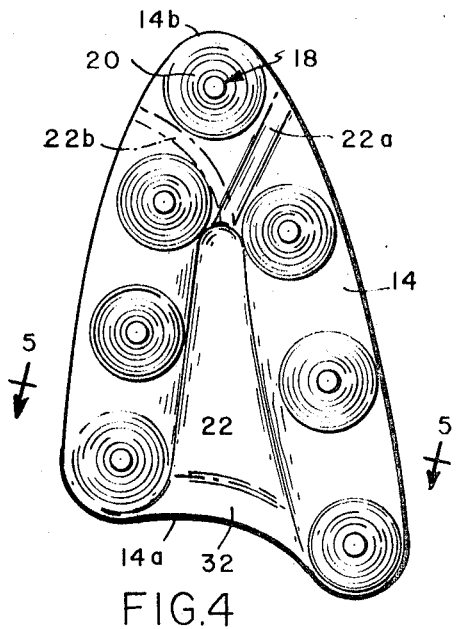
FIG. 4 is a plan view of the opposite side of the cleat plate shown in FIG. 3.

The cleat plates 14 and 16, in accordance with our pending applications, have at their opposite sides, as shown in FIGS. 3 and 7, marginal grooves 28 and 30 extending peripherally thereof to enhance the flow of elastomer over the upper edges of the plates and at the same time to provide for a substantial body of elastomer between the edges of the plates and the lasting margin to provide a more permanent bond between the plates and the upper. The forepart plate 14 differs from the heel part plate 16 in that the butt end 14a of the forepart plate has a bevel 32 to direct the flow of elastomer downwardly beneath the plate and also to assist entrance of the elastomer into the recess.

The cleat plates, as thus constructed, are supported in the bottom of the mold, that is, in holes provided in the sole plate, as shown in the pending applications, in a position situated between the upper surface of the sole plate and the lower surface of the lasted upper and when the elastomer is injected into the mold about the cleat plates the respective recesses 22, 22a, 22b, 24 and 26 provide sufficient clearance between the undersides of the plates and the sole plate so that the elastomer flows much more freely and hence faster, filling the cavity completely before it sets up appreciably thus insuring a uniform homogeneous bottom structure.

It should be understod that the present disclosure is for the purpose of illustration only and that this invention includes all modifications and equivalents falling within the scope of the appended claims.

We claim:

1. A cleat plate for incorporation into a shoe bottom by molding of an elastomeric material to the bottom of a lasted upper about the cleat plate, said cleat plate having projecting from one broad side a plurality of cleats arranged symmetrically with respect to the longitudinal center line of the plate and having at the broad side from which the cleats extend a shallow recess situated between the cleats at either side of the longitudinal center line and extending from one end of the plate along the longitudinal center line more than half the distance between the ends, said recess reducing the thickness of the plate in the area between the cleats.

2. A cleat plate according to claim 1, comprising bosses of circular cross-section at the broad side of the plate integral therewith surrounding each cleat.

3. A cleat plate according to claim 2, wherein the surfaces of the bosses are roughened and an adhesive is applied to the roughened surfaces of the bosses and to the surface portions of the cleats extending therefrom which will be centered within the bottom.

4. A cleat plate according to claim 1, wherein there is a recess extending from the opposite end of the plate toward the recess at the one end of the plate.

5. A cleat plate according to claim 1, wherein the opposite broad face of the plate contains peripherally thereof a shallow open edge groove.

6. A cleat plate for the forepart of a shoe bottom from one broad side of which extends a plurality of bosses with cleats centered therein, said cleat plate having toe and butt ends and said bosses being arranged symmetrically with respect to the longitudinal center line from end to end, said broad surface from which the bosses extend containing a shallow recess situated between the bosses at either side of the longitudinal center line which extends from said butt end along the center line more than half the distance toward the toe end, and constitutes an area of reduced thickness centrally of the plate between the bosses at either side.

7. A cleat plate according to claim 6, wherein the entrance to the recess at the butt end flares laterally toward the bosses at either side.

8. A cleat plate according to claim 6, wherein the bosses are tapered, their surfaces roughened and adhesive applied to the surfaces of the bosses.

9. A cleat plate according to claim 6, wherein there is a boss at the toe end of the center line and there is a lateral recess extending from the end of said shallow recess laterally between the boss at the toe end and the boss adjacent thereto at one side.

10. A cleat plate according to claim 6, wherein there are lateral recesses extending from the end of said shallow recess laterally between the boss at the toe end and the bosses adjacent thereto at each side.

11. A cleat plate for the heel end of a shoe bottom from one broad side of which extend a plurality of bosses with cleats extending therefrom, said cleat plate corresponding in configuration to the heel and having a breast line and a back line, and said bosses being arranged substantially symmetrically with respect to a longitudinal center line from front to back, said broad surface from which the bosses extend containing recesses reducing the thickness of the plate in the area intermediate the bosses comprising a recess extending from the breast line rearwardly and a recess extending from the back line forwardly with an island therebetween, the depths of said recesses being greater than half the thickness of the plate.

12. A cleat plate according to claim 11, wherein there are bosses at the broad side surrounding the portions of the cleats extending from said broad side, said bosses being of circular cross-section and having roughened surfaces to which an adhesive is applied.

13. A cleat plate according to claim 1, wherein the srface of the recess is roughened and coated with a layer of adhesive.

References Cited

UNITED STATES PATENTS

| | | | |
|---|---|---|---|
| 2,745,197 | 5/1956 | Holt | 36—67 D |
| 3,327,412 | 6/1967 | Williams et al. | 36—67 D |

PATRICK D. LAWSON, Primary Examiner